United States Patent [19]

Lumb

[11] Patent Number: 4,513,042

[45] Date of Patent: Apr. 23, 1985

[54] NONFLAMMABLE SLIVER KNIT HIGH PILE FABRIC

[75] Inventor: Douglas S. Lumb, Methuen, Mass.

[73] Assignee: Glenoit Mills, Inc., New York, N.Y.

[21] Appl. No.: 633,291

[22] Filed: Jul. 23, 1984

[51] Int. Cl.[3] .................... B32B 3/02

[52] U.S. Cl. .................... 428/95; 28/159; 66/9 A; 66/191; 427/289; 428/97; 428/253; 428/920

[58] Field of Search .................... 428/95, 97, 253, 920; 66/9 A, 191; 28/159; 427/289, 389.9

[56] References Cited

U.S. PATENT DOCUMENTS

| | | | |
|---|---|---|---|
| 1,791,741 | 2/1931 | Moore | 66/9 B |
| 3,226,952 | 1/1962 | Cassady | 66/9 B |
| 3,853,680 | 12/1974 | Daniel | 66/9 B |

*Primary Examiner*—James J. Bell

*Attorney, Agent, or Firm*—Harding, Earley, Follmer & Frailey

[57] ABSTRACT

A nonflammable sliver knit high pile fabric. The backing fabric is knitted from a flame retardant aramind spun yarn, the pile fibers are composed of a mixture of flame retardant rayon fibers and superwashed wool fibers and the back coating is constituted of a flame retardant composition. The fabric not only is flameproof, but it does not react to a flame by melting. It has good thermal insulation properties and is stable against shrinkage. The fabric is especially useful in the manufacture of wearing apparel intended for use in extreme environments, such as fire fighting and cold weather military operations.

7 Claims, 2 Drawing Figures

NONFLAMMABLE SLIVER KNIT HIGH PILE FABRIC

FIELD OF THE INVENTION AND THE PRIOR ART

The present invention concerns the knitting of nonflammable sliver high pile fabric on circular knitting machines. Sliver high pile knitted fabrics are composed of a jersey knit base fabric having staple sliver fibers interknitted therewith. The fibers are anchored by the stitches of the base fabric and comprise closely packed U-shaped tufts, the free ends of which extend from one side of the base fabric to provide a deep pile face. Such fabrics are illustrated, for example, in Moore U.S. Pat. No. 1,791,741, Cassady U.S. Pat. No. 3,226,952 and Daniel U.S. Pat. No. 3,853,680. Sliver knit high pile fabrics have been widely used for many years in the manufacture of imitation fur fabrics, and also have found use, for example, as linings for overcoats and footwear and as coverings for stuffed toys, floors and paint rollers. Frequently, such fabrics are given a light latex coating on their back (non-pile) surface to lock the fibers in place and stabilize the fabric.

The machines conventionally used for knitting sliver high pile fabrics are illustrated, for example, in Tauber U.S. Pat. No. 1,114,414, Hill U.S. Pat. No. 3,010,297, Schmidt U.S. Pat. No. 3,299,672, Wiesinger U.S. Pat. No. 3,427,829 and Thore U.S. Pat. No. 3,896,636. High pile fabric knitting machines generally are open top rotary knitting machines provided with a plurality of carding heads which function as fiber feeding units for supplying sliver fibers to the knitting needles. Usually, the knitting needles are mounted independently in a cylinder, which is rotatable relative to the several carding heads disposed at circumferentially spaced locations around the cylinder.

The carding heads for feeding sliver fibers to the needles of high pile fabric circular knitting machines are constituted of at least one pair of rotatable sliver feed rolls—usually having either wire-covered or fluted peripheries —a rotatable wire-covered main cylinder and a rotatable wire-covered doffer. The sliver feed rolls draw carded sliver in rope form from a source of supply, and deliver the fibers, in sheet form, to the main cylinder. The latter, acting as a transfer medium, conveys the sheet of sliver fibers to the doffer which, in turn, feeds the fibers to the needles of the knitting machine.

Throughout the long period of sliver high pile fabric knitting, a commercially acceptable nonflammable fabric, suitable for use in fire suits and similar items of wearing apparel, never has been developed. Such a fabric, to be practical in use, not only must be flameproof, but it must not react to a flame by melting, the hot drip being a danger to humans. The fabric also must have good thermal insulation properties, protecting a wearer from exposure to cold as well as to heat. And it must be stable against shrinkage.

SUMMARY OF THE INVENTION

The primary object of this invention is to provide a nonflammable sliver knit high pile fabric.

A further object of the invention is to provide a flameproof sliver knit high pile fabric which not only is incapable of sustaining a flame, but also does not react to a flame by melting.

A further object is to provide a nonflammable sliver knit high pile fabric which is resistant to melting in the presence of a flame, thereby avoiding the occurrence of hot drip due to melting, which has good thermal insulation properties in both cold and hot ambient atmospheres and is stable against shrinkage from either use or repeated washings.

Other objects and advantages of this invention will be readily apparent from the accompanying detailed description of the preferred embodiment thereof, which is illustrated in the views of the accompanying drawing.

DETAILED DESCRIPTION OF THE INVENTION

Figure 1:
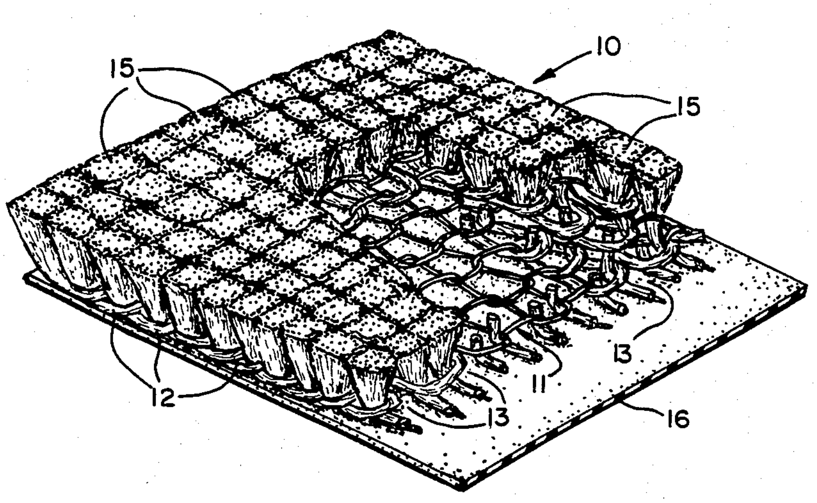
FIG. 1 is a diagrammatic view in perspective of a swatch of sliver knit high pile fabric made in accordance with this invention.

FIG. 1 of the drawing illustrates schematically a swatch of sliver knit high pile fabric 10 embodying this invention. The pile fabric 10 comprises a jersey knitted base fabric 11 having the usual plural courses 12 and plural wales 13 which are concatenated to form the several knitted stitches of which the base fabric 11 is composed. The knitted stitches of the base fabric 11 anchor the several closely packed U-shaped tufts 15 of sliver fibers, the free ends of which extend from the upper face of the base fabric 11 to provide a deep or high pile surface. The back or rear surface of the pile fabric 10 is covered with a light, thin latex coating 16 to lend stability to the fabric and to aid in locking the tufts 15 of fibers into the base fabric 11.

The base fabric 11 preferably is knitted from a flame retardant aramid yarn. A preferred spun yarn for this purpose is 20/1 'Kevlar' aramid yarn available from E. I. du Pont de Nemours and Company. It is exremely difficult to ignite and will not propogate a flame. It is strong, has a high resistance to chemicals and provides high fabric stability.

The fibers from which the tufts 15 are composed are a mixture of flame retardant rayon fibers and wool fibers which have been subjected to a shrink-proofing process. The rayon fibers preferably are of the permanently flame retardant type, frequently referred to as "pfr" rayon. An excellent flame retardant rayon for use in the tufts 15 of the pile fabric 10 is sold under the trademark "Durvil" by Avtex Fibers, Inc. The wool fibers are subjected to the well known chlorination process in order to impart the shrink-proofing quality thereto. Wool which has been subJected to such process often is referred to as superwashed wool, because of its shrink resistant quality.

Preferably, the ratio mixture of flame retardant rayon fibers and superwashed wool fibers constituting the tufts 15 should fall within the general range of 55% to 70% rayon fibers and 45% to 30% wool fibers. Based on present knowledge, the flammability of the fiber mixture becomes suspect when the ratio of flame retardant rayon fibers drops below 55%. When the ratio of wool fibers drops to less than 25%, the pile of the fabric tends to lose its resilience and is recoverability.

The rayon must be of a denier/staple combination suitable for sliver knitting. The superwashed wool must be top also cut to a length suitable for sliver knitting. In practice, an excellent nonflammable sliver knit high pile fabric has been produced in which the fibers constituting the tufts 15 are a mixture of 65% 3.0 denier flame retardant rayon fibers cut 1.25 inches in length and 35% 56*s* superwashed wool top cut 1.25 inches in length.

The back coating 16 is a flame retardant composition which stabilizes the fabric and anchors the tufts of pile fibers 15 in the base fabric 11. It should have a flexible hand suitable for apparel use and should not crack in normal wearing apparel use irrespective of whether it is exposed to abnormally high or to abnormally low temperature conditions. Flame retardant acrylic latex compositions presently are the preferred choice for use as the back coating 16. An excellent back coating material is the foamable flame retardant latex composition available from Astro Industries, Inc. under the trade designation "Sagiback KM-4". It is a blend of acrylic and other polymers plus fire retardant additives and can be applied to the back of the pile fabric 10 by conventional back coating equipment. It is very stable, highly resistant to repeated hot water washings and does not even char when exposed to flame.

Figure 2:
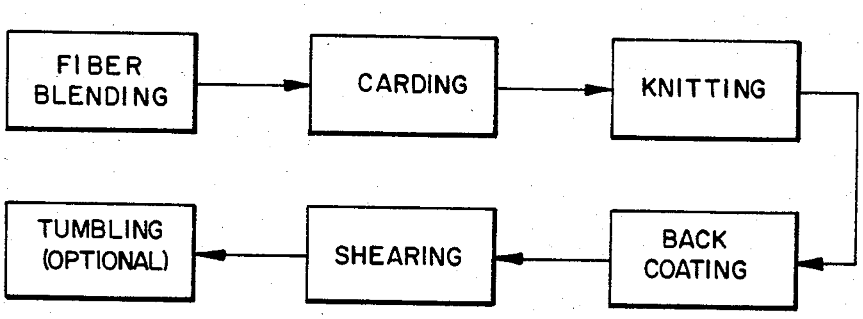
FIG. 2 is a flow diagram depicting the preferred mode of practicing the process of the invention.

The flow diagram of FIG. 2 depicts the preferred process for manufacturing the nonflammable sliver knit high pile fabric of this invention. The first step in the process is fiber blending, which is carried out mechanically by conventional fiber blending equipment. The fibers constituting the pile tufts 15 are thoroughly mixed to produce a uniform, intimate mixture of the rayon and wool fibers. The blended fibers then are converted to sliver by a conventional carding machine. The sliver produced is of the character normally used in sliver knitting, and is ready for introduction to the knitting machine. It may, for example, be processed to a grain weight of 240 grains per yard.

The sliver and the spun aramid yarn then are fed to a conventional multifeed sliver high pile fabric circular knitting machine to produce the fabric 10 in the usual tubular form. The knitting machine, for example, may be a Wildman Jacquard HP-8, 8 feed, 14 cut, sliver knitting machine. The fabric produced may, for example, weigh 22 ounces per linear yard with 27 courses per inch and 15 wales per inch.

After removal from the knitting machine, the tubular pile fabric 10 is opened and spread on the usual tenter frame to a width on the order of 60 inches. Thereupon, the flame retardant back coating 16 is applied. The back coating is cured in a conventional oven by exposure to heat for a period of three to four minutes at a temperature on the order of 340°. As is well known, curing of the back coating involves a time-temperature relationship. The curing conditions will vary according to the particular ingredients selected for use in the new fabric. After back coating, the fabric is removed from the tenter frame and sheared on a conventional Parks and Woolson shearing machine to the desired pile height.

If desired, following shearing, the fabric may be tumbled in a large tumbler to produce a pebble sheepskin effect in the pile. During tumbling, steam may be injected into the dryer for short intervals of time to provide a moist atmosphere, which facilitates the pile fiber curling process.

The several processing steps illustrated in FIG. 2 are common techniques well known in the manufacture of sliver knit high pile fabrics. However, by reason of the selection of the materials utilized, the resulting nonflammable sliver knit high pile fabric is entirely new. Heretofore, neither flame retardant rayon fibers nor superwashed wool fibers have been used in the manufacture of such fabrics. Further, neither a backing yarn of flame retardant aramid spun yarn nor a back coating composed of a flame retardant acrylic latex composition previously have been used in the manufacture of sliver knit fabrics. The nonflammable sliver knit fabric of this invention is totally flame proof, has superior heat insulting qualities and is highly resistant to shrinkage.

The important commercial tests for the nonflammable fabric of this invention are washability, flammability and heat transfer. The performance of the fabric, when submitted to standard commercial washability. flammability and heat transfer tests has been outstanding.

When the fabric of this invention having a rayon-wool ratio of 65%-35% was subjected to the standard AATCC Test Method 96-1980 for laundering knitted fabrics, the shrinkage after five 140° F. washings was less than 2% in either direction.

When the same fabric was subjected to Federal Standard Test No. 191-5903 for flame resistance of fabrics, the fabric of this invention received a zero rating, i.e. the top rating indicating no burn length and no char length.

When the fabric was subjected to standard heat transfer tests, to determine the extent of its thermal insulation qualities, the results were equally impressive. The fabric was subjected to both ASTM D 1518-77 testing to determine its "Clo", i.e. its thermal transmission quality in a cold atmosphere, and to ASTM D 4108-82 to determine its "TPP", i.e. its thermal conductivity in an open-flame atmosphere, such as would be present during firefighting.

In both cases, tests results were highly impressive. Testing of the fabric pursuant to the ASTM D 1518-77 test method for thermal transmittance revealed that the new fabric had a "Clo" within the range of 1.90 to 2.10, even after the fabric had been laundered three times. The ASTM D 4108-82 test for thermal protective performance revealed the following:

a. TPP at Heat Flux of 2.0 cal/cm$^2$.s
   Pile to flame—36.8
   Back to flame—33.4
b. Tolerance time
   Pile to flame—18.4 seconds
   Back to flame—16.7 seconds The results of the standard commercial testing of the nonflammable pile fabric of this invention reveals not only that the fabric is incapable of sustaining a flame, or even of melting in the presence of a flame, but it also has extremely good thermal insulation properties in both cold and flame-hot ambient atmospheres and is highly stable against shrinkage. The fabric has applicability to a wide range of uses where extreme atmospheric conditions are present, such as in fire suits or in other firefighting gear, such as footwear, headwear and gloves, or for cold weather wear, such as in military cold weather uniforms. It is useful where considerations of public safety call for nonflammable fabrics having good thermal insulation qualities, such as wall coverings and seating materials in public buildings, aircraft and ships. It also is useful for automotive upholstery and for cold weather gear for oil riggers, electric linemen and the like.

Although a preferred embodiment of this invention has been shown and described herein for the purpose of illustration, as required by Title 35 U.S.C. §112, it is to be understood that various changes, modifications and alterations may be made thereto without departing from the spirit and utility of this invention, or the scope thereof as set forth in the claims.

I claim:

1. A nonflammable sliver knit high pile fabric characterized by (a) a backing fabric knitted from flame retardant aramid spun yarn, (b) pile fibers composed of a mixture of flame retardant rayon fibers and superwashed wool fibers, (c) said mixture of fibers falling within the general range of 55% to 70% of said rayon fibers and 45% to 30% of said wool fibers, and (d) a back coating composed of a flame retardant composition.

2. The fabric of Claim 1, characterized by the pile fibers being composed of a mixture constituted of 65% flame retardant rayon fibers and 35% superwashed wool fibers.

3. The fabric of Claim 1, characterized by a back coating composed of an acrylic latex composition.

4. A flame proof sliver knit high pile fabric characterized by (a) a backing fabric knitted from flame retardant aramid yarn, (b) pile fibers composed of a mixture of flame retardant rayon fibers and shrink resistant wool fibers, (c) said mixture of fibers containing not less than 55% of said rayon fibers and not less than 30% of said wool fibers, and (d) a flexible, flame retardant back coating for stabilizing the fabric.

5. A process of making nonflammable sliver knit high pile fabric comprising the following steps:

(a) blending staple flame retardant rayon fibers and staple superwashed wool fibers to provide a mixture of such fibers falling within the general range of 55% to 70% of said rayon fibers and 45% to 30% of said wool fibers, (b) carding the mixed fibers to provide a sliver, (c) knitting the sliver with a backing yarn composed of a flame retardant aramid yarn to produce a high pile fabric, (d) back coating the high pile fabric with a flame retardant coating and (e) shearing the pile face of the fabric.

6. The process of Claim 5, further including the step of blending the fibers to produce a fiber mixture constituted of 65% flame retardant rayon fibers and 35% superwashed wool fibers.

7. The process of Claim 5, further including the step of tumbling the pile fabric in the presence of steam to produce a pile face having a pebble sheepskin effect.

* * * * *